United States Patent
Laurell et al.

(10) Patent No.: US 12,048,921 B2
(45) Date of Patent: Jul. 30, 2024

(54) METHOD FOR TRANSPORTING POLYOLEFIN PARTICLES IN A POLYMER CONVEYING SYSTEM

(71) Applicant: BOREALIS AG, Vienna (AT)

(72) Inventors: Jussi Laurell, Porvoo (FI); Jenni Valonen, Porvoo (FI); Eero Partanen, Porvoo (FI); Henry Sleijster, Sittard Geleen (NL); Richard Havenaar, Sittard Geleen (NL)

(73) Assignee: BOREALIS AG, Vienna (AT)

( * ) Notice: Subject to any disclaimer, the term of this patent is extended or adjusted under 35 U.S.C. 154(b) by 922 days.

(21) Appl. No.: 17/043,505

(22) PCT Filed: Apr. 11, 2019

(86) PCT No.: PCT/EP2019/059185
§ 371 (c)(1),
(2) Date: Sep. 29, 2020

(87) PCT Pub. No.: WO2019/201721
PCT Pub. Date: Oct. 24, 2019

(65) Prior Publication Data
US 2021/0053019 A1 Feb. 25, 2021

(30) Foreign Application Priority Data

Apr. 20, 2018 (EP) .................... 18168390

(51) Int. Cl.
*B01J 8/00* (2006.01)
*C08F 210/02* (2006.01)
(Continued)

(52) U.S. Cl.
CPC ........... *B01J 8/0015* (2013.01); *C08F 210/02* (2013.01); *C08F 210/06* (2013.01); *B01J 2208/00761* (2013.01); *B03C 3/38* (2013.01)

(58) Field of Classification Search
None
See application file for complete search history.

(56) References Cited

U.S. PATENT DOCUMENTS 3,083,193 A * 3/1963 Kolner .................. C08F 8/50
159/DIG. 10
8,905,681 B2 * 12/2014 Schneider .............. B65G 53/06
406/173

(Continued)

FOREIGN PATENT DOCUMENTS

CN 107428421 A * 12/2017 ............ B29B 9/065
EP 0990606 A2 4/2000

(Continued)

OTHER PUBLICATIONS

Applicant: Borealis AG; "Method for Transporting Polyolefin Particles in a Polymer Conveying System"; International PCT Application No. PCT/EP2019/059185, International Filing Date: Apr. 11, 2019; PCT International Search Report and PCT Written Opinion; Authorized Officer: Philippe Thomasson; Date of Completion: Jun. 24, 2019; 12 pgs.

*Primary Examiner* — William R Harp
(74) *Attorney, Agent, or Firm* — Tarolli, Sundheim, Covell & Tummino LLP

(57) ABSTRACT

The present invention relates to a method for transporting polyolefin particles in a polymer conveying system, comprising the steps of a) Subjecting the polyolefin particles to moist conveying gas to produce wetted polyolefin particles; b) Transporting the wetted polyolefin particles through at least one conveying line; and c) Controlling the amount of moisture in the conveying gas of the polymer conveying system as such that at the end point of the at least one conveying line the relative humidity of the conveying gas ($RH_{CG}$) is 40% to 100%, the use of said method in an in-plant polymer conveying system, the use of said method (Continued)

for improving dust and/or angel hair removal in polymer conveying systems and the use of said method for increasing conveying capacity of polyolefin particles with a density of from less than 850 to 910 kg/m$^3$.

12 Claims, 4 Drawing Sheets

(51) Int. Cl.
*C08F 210/06* (2006.01)
*B03C 3/38* (2006.01)

(56) References Cited

U.S. PATENT DOCUMENTS

| | | | |
|---|---|---|---|
| 10,647,527 B2 * | 5/2020 | Stark | B65G 53/10 |
| 10,815,078 B2 * | 10/2020 | Stark | B65G 53/60 |
| 11,254,520 B2 * | 2/2022 | Stark | B65G 53/66 |

FOREIGN PATENT DOCUMENTS

| | | | | |
|---|---|---|---|---|
| EP | 1818111 A2 | 8/2007 | | |
| EP | 2711097 A1 | 3/2014 | | |
| JP | 2001247217 A | 9/2001 | | |
| WO | WO-2016118687 A1 * | 7/2016 | | B29B 9/065 |

* cited by examiner

120# METHOD FOR TRANSPORTING POLYOLEFIN PARTICLES IN A POLYMER CONVEYING SYSTEM

The present invention relates to a method for transporting polyolefin particles in a polymer conveying system using moisture conveying gas and the use of said method in an in-plant polymer conveying system.

BACKGROUND ART

The transport of polyolefin particles such as polyolefin pellets is a necessary part of production, shipment and customer's handling before processing. Several different methods for conveying polyolefin particles are generally used such as hydraulic conveying methods or conveying methods using a conveying gas.

When using conveying methods with conveying gas such as pneumatic conveying the polyolefin particles collide against the walls of the conveying lines so that abrasion in form of dust or angel hair occurs.

For cleaning the polyolefin particles from dust and angel hair gas conveying systems usually include dust removal devices such as elutriators. Elutriators usually work with gas counter flow principle. The gas counter flow, e.g. air counter flow conveys the dust and angel hair vertically upwards whereby gravity forces the heavier polyolefin particles downwards. However, static electricity forces are strong enough to keep big amount of dust on the pellet surface in spite of the air counter flow. Air counter flow cannot be increased above the limit where pellets are not any more falling downwards due to gravity.

Polyolefin pellets and powder are known to form static electricity during the pneumatic transport. Static electric forces keep the fine dust firmly on the pellet surface so that dust is only insufficiently removed in the dust removal devices.

Additionally, polyolefin particles having a low density of 910 kg/m$^3$ or less tend to stick together and on the surface of the conveying lines due to their elastomeric behaviour. Consequently, the resistance value in the pneumatic conveying system increases resulting in higher conveying pressures at lower conveying capacity.

Also the silo outflow of low density polyolefin particles at ambient temperature can be reduced due to their elastomeric properties.

Thus, there is a need for an improved method for conveying polyolefin particles in a gas conveying system, which improves dust removal and for polyolefins with low density improves the conveying capacity.

It has surprisingly been found that by conveying polyolefin particles with moist conveying gas static forces during conveying the polyolefin pellets can be significantly reduced which improves dust removal. Additionally the conveying capacity of polyolefin particles with low density is improved.

SUMMARY OF THE INVENTION

The present invention relates to a method for transporting polyolefin particles in a polymer conveying system, comprising the steps of
a) Subjecting the polyolefin particles to moist conveying gas to produce wetted polyolefin particles;
b) Transporting the wetted polyolefin particles through at least one conveying line; and
c) Controlling the amount of moisture in the conveying gas of the polymer conveying system as such that at the downstream end point of the at least one conveying line the relative humidity ($RH_{CG}$) of the conveying gas is 40% to 100%.

Further, the present invention relates to the use of the method according to the present invention as described above or below in an in-plant polymer conveying system, suitably situated in post-production.

Still further, the present invention relates to the use of the according to the present invention as described above or below for improving dust and/or angel hair separation from polyolefin particles in polymer conveying systems.

Finally, the present invention relates to the use of the method according to the present invention as described above or below for increasing conveying capacity of polyolefin particles comprising polyolefins with a density of from less than 850 to 910 kg/m$^3$.

DEFINITIONS

A polyolefin is a polymer produced from olefin monomers having the general formula $C_nH_{2n}$. Suitably the olefin monomers are selected from alpha-olefin monomers having from 2 to 12 carbon atoms.

Conveying gas is a gas used to transport polyolefin particles in a polymer conveying system. The polymer conveying system can be a pneumatic conveying system or a vacuum conveying system.

Relative humidity of the conveying gas ($RH_{CG}$) is the ratio of the partial pressure of water vapor in the conveying gas to the equilibrium vapor pressure of water at a given temperature.

Relative humidity of the storage gas ($RH_{SG}$) is the ratio of the partial pressure of water vapor to the equilibrium vapor pressure of water at a given temperature of the storage gas under storing conditions.

Storage gas is the gas surrounding the polyolefin particles during storage. Usually, the polyolefin particles are stored in a storage bin such as a storage hopper or a storage silo. The storage bin can be an intermediate storage bin in which the polyolefin particles are stored temporarily before further processing or a distribution storage bin in which the polyolefin particles are stored before distribution.

The conveying capacity is the conveying rate of the polyolefin particles, usually given in kg/min or tons/hr, at a certain conveying gas flow and conveying gas pressure for a certain conveying line dimension.

Ionized gas is a gas which includes positive charges by stripping away electrons orbiting the atomic nuclei or negative charges by adding electrons or both by separating electrons and atomic nuclei.

An in-plant polymer conveying system is a polymer conveying system which is situated at a polyolefin production site, usable in any kind of post-production transport such as transporting the polyolefin powder from the polymerization reactor or transporting the polyolefin pellets after extrusion and pelletization.

FIGURES

DETAILED DESCRIPTION OF THE INVENTION

Method

Figure 1:
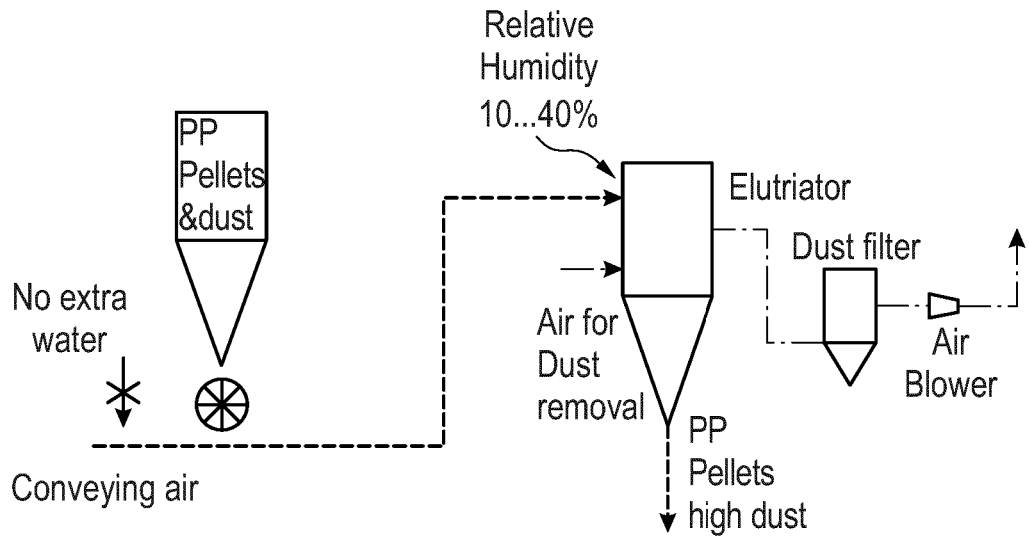
FIG. 1 shows a schematic overview of a pneumatic conveying and dust removal system without addition of water into the conveying air (Reference).

The present invention relates to a method for transporting polyolefin particles in a polymer conveying system, comprising the steps of
 a) Subjecting the polyolefin particles to moist conveying gas to produce wetted polyolefin particles;
 b) Transporting the wetted polyolefin particles through at least one conveying line; and
 c) Controlling the amount of moisture in the conveying gas of the polymer conveying system as such that at the end point of the at least one conveying line the relative humidity of the conveying gas ($RH_{CG}$) is 40% to 100%.

The polymer conveying system can be any polymer conveying system suitable for transporting polyolefin particles by means of a conveying gas. Suitably the polymer conveying system is a pneumatic polymer conveying system or a vacuum polymer conveying system, preferably a pneumatic polymer conveying system.

In a pneumatic polymer conveying system polymer particles are transported through conveying line(s) by means of conveying gas pressure.

In a vacuum polymer conveying system polymer particles are transported through conveying line(s) by means of a vacuum usually produced from a vacuum pump.

The conveying gas is generally any gas suitable for conveying polyolefin particles. Suitable conveying gases are selected from air, nitrogen and noble gases such as argon. Mostly preferred the conveying gas is selected air.

The moist conveying gas is preferably produced by dosing water, preferably demineralized water, into the conveying gas of the polymer conveying system at the upstream end of the at least one conveying line.

Thereby, the water can be dosed in form of liquid water or in form of water vapour.

Preferably the water is introduced into the at least one conveying line by means of at least one nozzle.

Suitably the water is dosed into the conveying gas in or near at least one compressor and/or blower of the polymer conveying system at the upstream end of the at least one conveying line.

Thereby, the compressor and/or blower is preferably used for providing the conveying gas pressure in a pneumatic polymer conveying system.

The water is preferably dosed into the conveying gas only in one point at the upstream end of the at least one conveying line.

It has been found that dosing the water only once is usually sufficient to increase dust separation at any stage of the polymer conveying system.

The amount of water introduced into the conveying line is preferably controlled by means of at least one valve, which preferably is connected to the nozzle.

In the polymer conveying system the polyolefin particles are preferably brought into direct contact to the moist conveying gas before transporting the polyolefin particles through at least one conveying line. Consequently, the polyolefin particles are wetted by the moist conveying gas.

Preferably, the relative humidity of the conveying gas ($RH_{CG}$) is controlled in process step c) as such that at the downstream end of the at least one conveying line the relative humidity of the conveying gas ($RH_{CG}$) is in the range of from 60% to 95%, more preferably from 65% to 90%, most preferably from 70% to 85%.

Relative humidity of the conveying gas ($RH_{CG}$) depends on the temperature of the conveying gas. At higher temperatures of the conveying gas higher amounts of water have to be dosed into the conveying gas in order to reach the target relative humidity of the conveying gas ($RH_{CG}$) than at lower temperatures of the conveying gas.

Usually, the temperature of the conveying gas is maintained in a range of from 20° C. to 30° C., preferably of from 22° C. to 25° C.

In some embodiments, the temperature of the conveying gas is maintained in a range of from 5° C. to 20° C., preferably of from 10° C. to 15° C.

In order to maintain the conveying gas in the preferred temperature range the conveying gas can be either heated or cooled preferably by means of a heat exchanger.

For example, for transporting hot polyolefin pellets from the extruder and pelletizer to a storage bin the conveying gas can be cooled to reach target temperature.

When cooling the conveying gas, water deposition can occur. Thus, the method of the present invention may additionally include a water separation step in order to separate free water from the polyolefin particles.

The water separation step usually is conducted in a water separating device.

The method of the present invention preferably further comprises the step of: e) Separating dust from the conveyed polyolefin particles.

Preferably, dust and/or angel hair are separated from the conveyed polyolefin particles in a dust separation device.

The dust separation device is suitably located near the downstream end of the polymer conveying system, preferably upstream of the final storage bin. When locating the dust separation device at the downstream end of the polymer conveying system only one dust separation step needs to be present before the final storage of the polyolefin particles.

However, the polymer conveying system may also include more than one dust separation device. The devices can then be located at different parts of the conveying system. Consequently, the method of the present invention may include more than one dust separating step e).

Since dust is usually produced as abrasion during the conveying steps b) of the inventive method the dust separation step is suitably conducted on conveyed polyolefin particles.

Additional dust separation steps e) may be located upstream of the treatment steps of the polyolefin particles, such as e.g. crosslinking steps, impregnating steps, compounding steps or the like.

Dust separation devices can be any devices suitable for separating dust and angel hair from the polyolefin particles such as cyclone dust separators, vacuum based dust separators or pneumatic dust separation device.

A preferred dust separation device is a pneumatic dust separation device, more preferably a counter gas flow dust separation device. In a counter gas flow dust separation device the gas counter flow, e.g. air counter flow, conveys the dust and angel hair vertically upwards whereby gravity forces the heavier polyolefin particles downwards. Mostly preferred is an elutriator. One commercially available example for a counter gas flow dust separation device suitable for separating dust in process step e) is the Pelletron DeDuster® from Pelletron Corporation, Lancaster, USA.

Further, the method of the present invention preferably further comprises the steps of:

f) Reducing the moisture in the storage gas surrounding the conveyed polyolefin particles to 20% to 80% relative humidity of the storage gas ($RH_{SG}$) to produce polyolefin particles with reduced moisture content; and g) Storing the polyolefin particles with reduced moisture content in the storage gas with reduced relative humidity.

Preferably the relative humidity of the storage gas ($RH_{SG}$) is reduced to 25% to 75%, more preferably 30% to 70%, still more preferably 35% to 65% and most preferably 40% to 60%.

By means of reducing the relative humidity of the storage gas ($RH_{SG}$) the moisture content of the conveyed polyolefin particles surrounded by the storage gas is reduced at the same time.

Process steps f) and g) preferably take place at the downstream end of the polymer conveying system for final storage of the polyolefin particles. The reason for drying the polyolefin particles is to avoid sticking of the wetted polyolefin particles in the final storage bin which may cause problems when removing the polyolefin particles from the final storage bin such as a silo.

Further, unwanted chemical reactions of the polyolefin particles in the storage bin catalysed by moisture under pressure of storage can be avoided.

However, process steps f) and g) can also take place for intermediate storage before the polyolefin particles are e.g. further processed.

The storing conditions of the polyolefin particles, such as pressure and temperature, preferably reflect the conditions usually used in the art for storing polyolefin particles.

In one specific embodiment the method of the present invention further includes the step of d) Subjecting the conveyed polyolefin particles to ionized gas.

It has surprisingly been found that by additionally contacting the conveyed polyolefin particles to ionized gas the dust separation can be further improved.

Ionized gas such as ionized air, nitrogen or noble gas like argon, is preferably produced in an ionizer. Thereby, the working principle of ionizers is well known in the art.

Preferably the ionizer is a high voltage ionizer preferably with an operating voltage of from 1 to 10 kV, more preferably from 2 to 8 kV, still more preferably from 3 to 5 kV.

The ionizer can be a negative ion generator, a positive ion generator or an electrostatic discharge (ESD) ionizer, preferably an electrostatic discharge (ESD) ionizer.

Ionized gas can be negatively charged gas, positively charged gas or neutrally charged gas, preferably neutrally charged gas.

Preferably the ionized gas is selected from ionized air, ionized nitrogen or ionized noble gas like ionized argon and more preferably is ionized air.

It is preferred that process step d) is conducted in conjunction with the dust separation step e).

This means that the conveyed polyolefin particles are preferably contacted with ionized gas directly before the separation of the dust and/or angel hair in process step e).

Thereby, the ionizer is preferably located in the polymer conveying system in close proximity with the dust separation device.

The ionizer can be located within the dust separating device e.g. as such that the gas in the dust separating device is ionized and the polyolefin particles are subjected to the ionized air.

The ionizer can also be located outside but in close proximity to the dust separating device as such that e.g. the gas introduced into the dust separating device for separating the dust from the polyolefin particles can be ionized by the ionizer before entering the dust separating device.

Preferably the dust separating device is a counter gas flow dust separating device, such as an elutriator, and ionized gas, such as ionized air, produced in an ionizer outside of the dust separating device is introduced into the counter gas flow dust separating device as ionized counter gas flow, such as ionized counter air flow.

The polyolefin particles conveyed by the method of the present invention can be polyolefin powder or polyolefin pellets, preferably polyolefin pellets.

It is preferred that the polyolefins are selected from alpha-olefin homo- or copolymers including one or more alpha-olefin monomers having from 2 to 12 carbon atoms, preferably from 2 to 8 carbon atoms and mostly preferred having from 2 to 6 carbon atoms.

Preferably, the polyolefins are ethylene or propylene based polyolefins such as ethylene homo- or copolymers or propylene homo- or copolymers.

Ethylene copolymers are preferably polymers comprising ethylene monomer units as major component and one or more comonomer units selected from alpha-olefin monomers having from 3 to 12 carbon atoms, preferably alpha-olefin monomers having from 3 to 10 carbon atoms, more preferably alpha-olefin monomers having from 3 to 8 carbon atoms such as propylene, 1-butene, 1-hexene and 1-octene. Propylene copolymers are preferably polymers comprising propylene monomer units as major component and one or more comonomer units selected from alpha-olefin monomers having from 2 and 4 to 12 carbon atoms, preferably alpha-olefin monomers having from 2 and 4 to 8 carbon atoms, more preferably alpha-olefin monomers having from 2 and 4 to 6 carbon atoms such as ethylene, 1-butene, 1-hexene and 1-octene.

In one embodiment the polyolefin particles comprise polyolefin having a density of from 900 kg/m³ to 980 kg/m³, determined according to ISO 1183.

Such polyolefins preferably are thermoplastic polyolefins such as olefin homopolymers, olefin copolymers, like olefin random copolymers, or heterophasic olefin copolymers such as thermoplastic ethylene homopolymers, random copolymers or block copolymers and propylene homopolymers, random copolymers or heterophasic copolymers.

It has been surprisingly found that for polyolefin particles comprising polyolefin having a density of from 900 kg/m³ to 980 kg/m³ the method of the present invention improves dust separation.

In another embodiment the polyolefin particles comprise polyolefin having a density of from less than 850 kg/m³ to 910 kg/m³, determined according to ISO 1183.

Such low density polyolefins preferably are polyolefin elastomers (POE) having a density of less than 880 kg/m³, polyolefin plastomers (POP) having a density of 880 kg/m³ to 910 kg/m³ or olefin low density polymers such as low density polyethylenes (LDPEs).

It has been surprisingly found that for low density polyolefin particles the method of the present invention not only improves dust separation but also improves conveying capacity by reducing the sticking of the low density polyolefin particles which occurs due to their elastomeric properties.

With the method of the present invention low density polyolefin particles show a higher conveying capacity at reduced conveying pressure in a pneumatic polymer conveying system.

Use

The method of the present invention can be used in any kind of polymer conveying system suitable for transporting polyolefin particles by means of conveying gas such as in-plant polymer conveying system like post in post production polymer conveying systems or costumer polymer conveying systems.

Thereby, the present invention is related to the use of the method according to the present invention as described above or below in an in-plant polymer conveying system, suitably situated in post-production.

As discussed above and shown below in the examples the method of the present invention surprisingly improves dust separation from polyolefin particles in a polymer conveying system suitable for transporting polyolefin particles by means of conveying gas.

Thus, the present invention also relates to the use of the method according to the present invention as described above or below for improving dust and/or angel hair separation from polyolefin particles in polymer conveying systems.

It has further been surprisingly found, as discussed above and shown below in the examples, that for low density polyolefins such as polyolefins with a density of from less than 850 kg/m³ to 910 kg/m³ such as polyolefin plastomers (POP), polyolefin elastomers (POE) or olefin low density polymers such as low density polyethylenes (LDPEs) not only dust and angel hair separation is improved but also conveying capacity can be improved.

Thus, the present invention also relates to the use of the method according to the present invention as described above or below for increasing conveying capacity of polyolefin particles comprising polyolefins with a density of from less than 850 to 910 kg/m³.

EXAMPLES a) Dust Removal from Pellets of Bimodal Propylene Copolymer Resins

Reference

In a polymer conveying system as illustrated in FIG. 1, pellets of a propylene copolymer resin having a density of 905 kg/m³ (ISO 1183) and a melt flow rate (230° C., 2.16 kg) of 0.25 g/10 min (ISO 1133) suitable for pipe applications were conveyed through a conveying line to a counter flow elutriator. The pellets used for the conveying experiment were taken from the storage silo. The relative humidity of the conveying air ($RH_{CG}$) measured at the entry of the elutriator was 10 to 40%.

Amount of conveyed pellets: about 45 t/h
  Conveying air flow: about 5 t/h
  Conveying air temperature: about 35° C. to 70° C.

In the elutriator counter flow air was introduced in order to separate dust and angel hair from the propylene copolymer pellets. The amount of dust still attached to the pellets removed from the elutriator was measured.

Example 1

Figure 2:
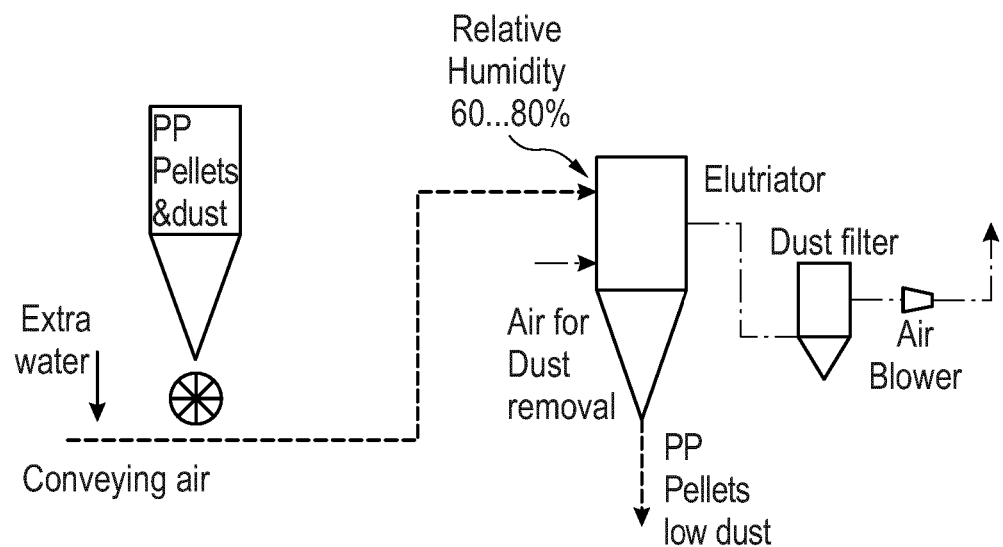
FIG. 2 shows a schematic overview of a pneumatic conveying and dust removal system with adding water into the conveying air (Example 1).

The experiment of the reference as described above was repeated with the difference that demineralized water was fed into the conveying line directly downstream of the air blower with a water flow of 300 kg/h. All other parameters were kept constant. The relative humidity of the conveying air ($RH_{CG}$) measured at the entry of the elutriator was 60 to 80%. The polymer conveying system used for example 1 is illustrated in FIG. 2.

Example 2

Figure 3:
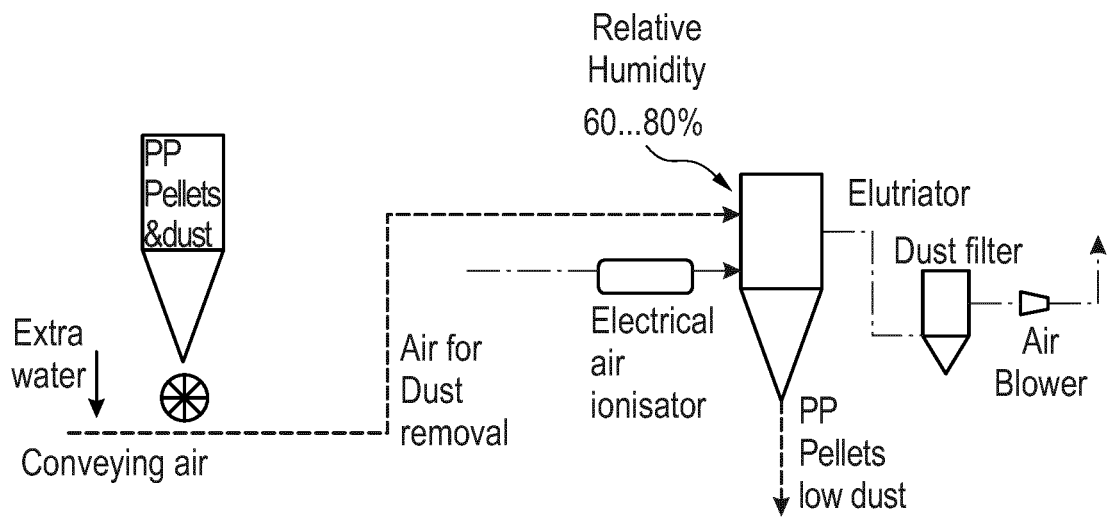
FIG. 3 shows a schematic overview of a pneumatic conveying and dust removal system with adding water into the conveying air and subjecting the polyolefin pellets to ionized air (Example 2).

The experiment of the example 1 as described above was repeated with the difference that ionized air was introduced into the elutriator as counter air flow. As ionizer in-line ionizer Conveyostat®, commercially available from Simco-Ion, Hatfield, USA, and operating at an operating voltage of 4 kV AC, had been integrated into the air feeding line of the elutriator. All other parameters were kept constant. The relative humidity of the conveying air ($RH_{CG}$) measured at the entry of the elutriator was 60 to 80%. The polymer conveying system used for example 2 is illustrated in FIG. 3.

Figure 4:
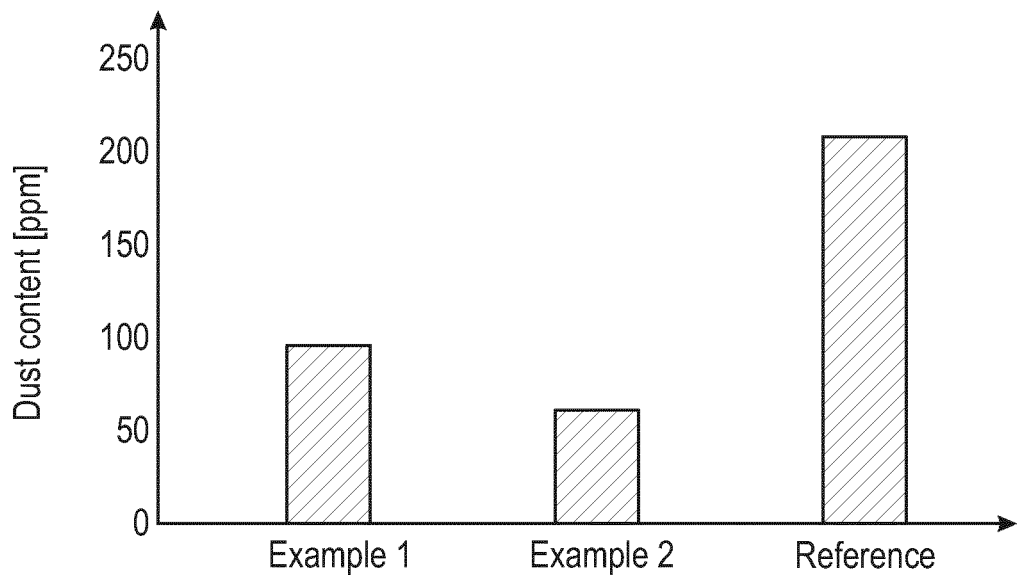
FIG. 4 shows the amount of dust measured for the polyolefin pellets of examples 1, 2 and Reference

The amounts of dust attached to the pellets removed from the elutriator of the reference example and examples 1 and 2 are shown in FIG. 4.

Thereby, it can be seen that dust removal has been increased in example 1 two-times compared to the reference example. The additional use of ionized air in the elutriator additional improves dust removal.

b) Pellet Flow of Polyolefin Elastomers (POE) after Compression

For simulating the silo-outflow of polyolefin elastomer (POE) pellets cylinders were filled with pellets of polyethylene elastomers (POE) with a density of 870 kg/m³ (ISO 1183), melt flow rate (190° C., 2.16 kg) of 1.0 g/10 min and a Vicat softening temperature of 39° C. (ASTM D 1525, method A). The pellets were compressed for 2 days with loads of 20 kg, 25 kg, 30 kg, 35 kg and 40 kg. The relative humidity in the cylinders was maintained during storage at 30%, 50%, 70% and 90%. The temperature was maintained below 20° C.

After 2 days of compressed storage the load was removed and the time needed for the out-flow of the POE pellets out of the cylinders was measured.

Figure 5:
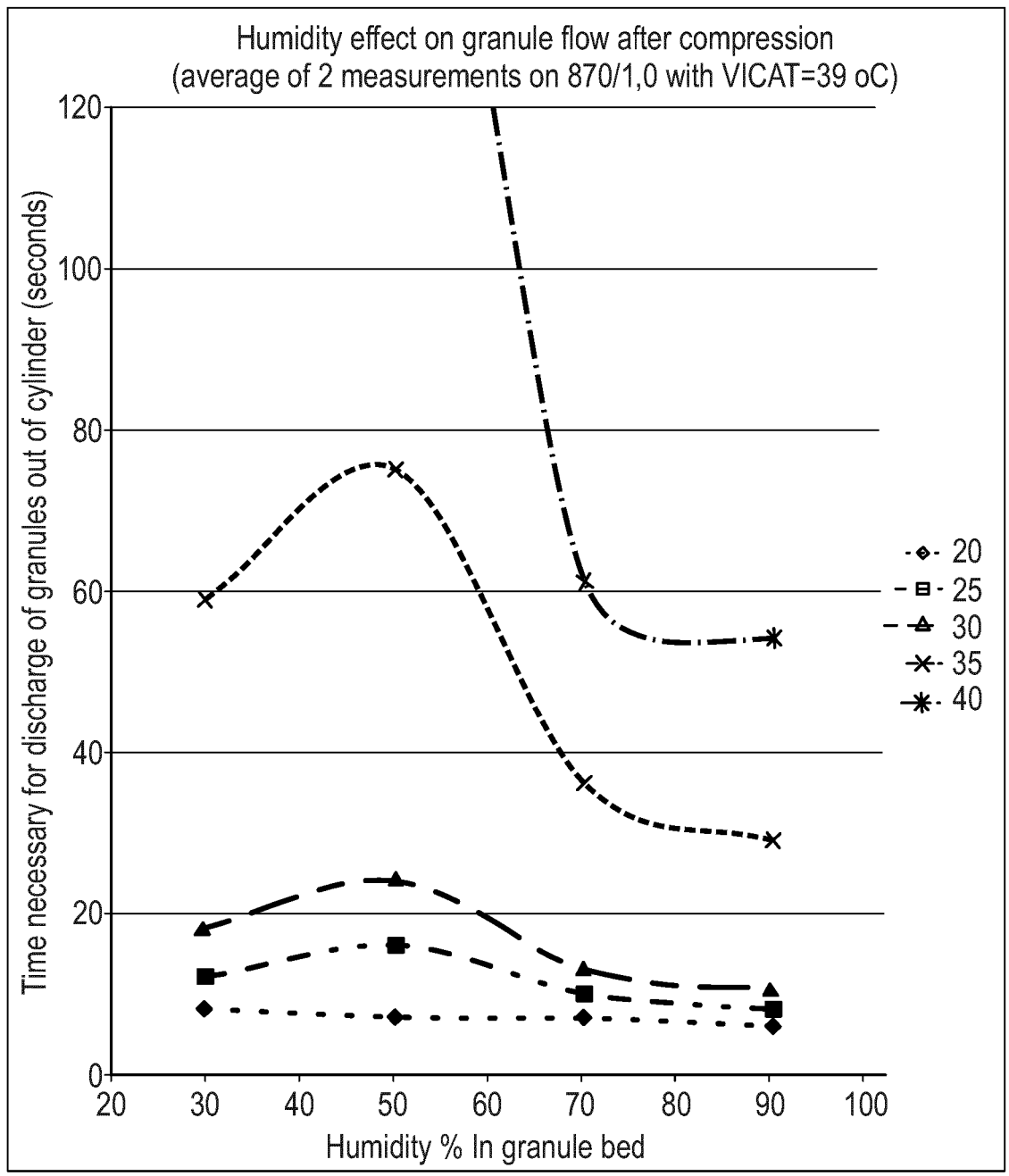
FIG. 5 shows the time necessary for discharging pellets of polyolefin elastomers (POE) after storage in cylinders of experiment b)
Figure 6:
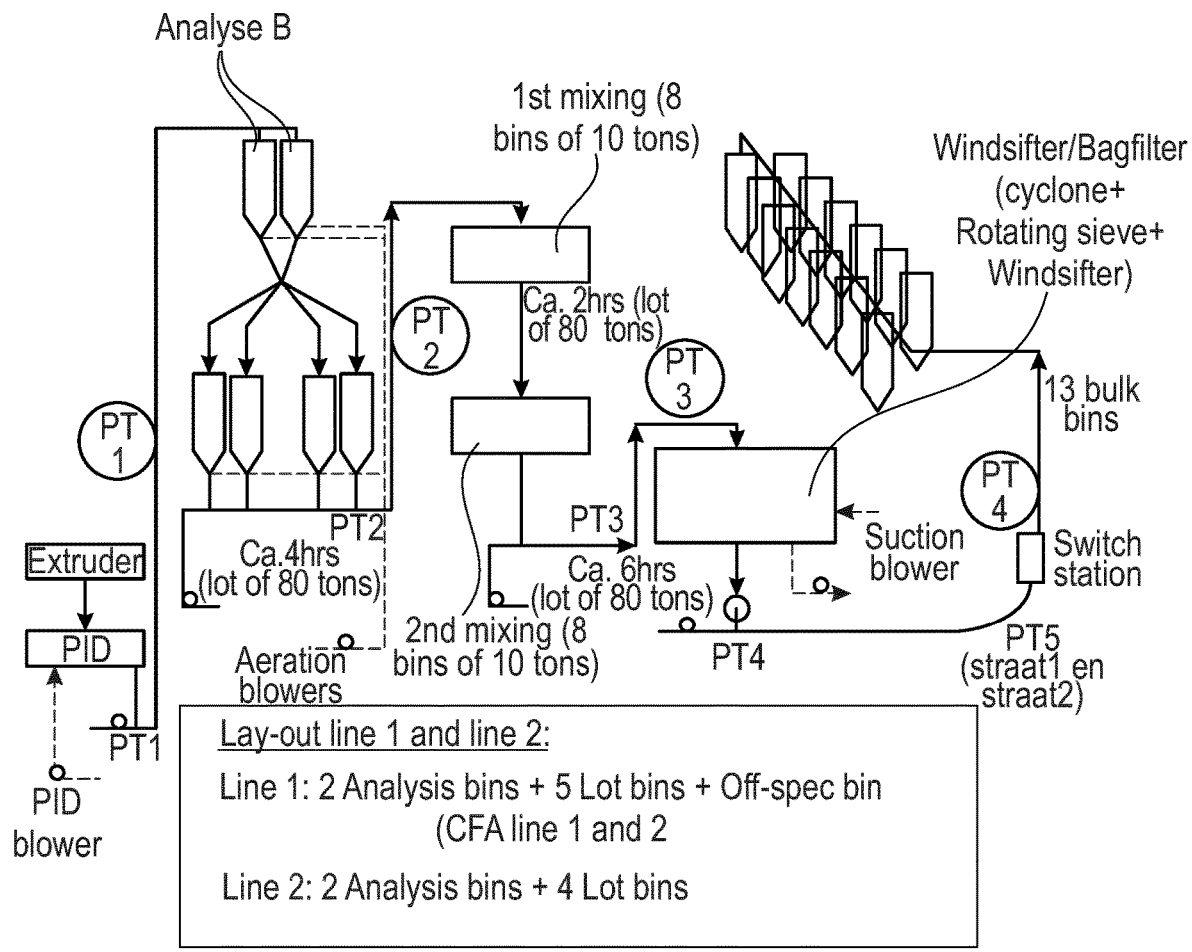
FIG. 6 shows a schematic overview of a pneumatic conveying system with adding water into the conveying air of experiment c)

The results of this experiment are shown in FIG. 5.

Thereby, it can be seen that at a relative humidity of 50% the stickiness of the POE pellets is significantly increased for all loads so that a higher amount of time is necessary for the out-flow of the pellets from the cylinders. At higher relative humidity of 70% and 90% the out-flow time is significantly reduced indicating a lower stickiness of the POE pellets.

c) Conveying Capacity of Polyolefin Elastomer (POE) and Polyolefin Plastomer (POP) Pellets In a conveying system as illustrated in FIG. 5 POP/POE pellets were conveyed in four conveying lines PT1, PT2, PT3 and PT4. Storage bins were situated after conveying lines PT1, PT2 and the combination of PT3/PT4. After the last bulk bins the POE product was taken out to a cold warehouse with a temperature of below 20° C., POP product was taken without restrictions to bulk, bags and other and had no need for temperature conditioning of the storage facilities.

The following conditions were maintained in the conveying system of FIG. 5:

| Stage | PT1 | PT2 | PT3 | PT4 | "Cold" Warehouse |
|---|---|---|---|---|---|
| Relative Humidity (%) of Silo out flow | 80% RH (max. 100% RH) | 80% RH - max. 100% RH | 70-80% RH (max. 90% RH) | max. 80% RH | 60-80% RH |
| Clean air Temperature (° C.) | about 15° C. (<20° C.) | about 15° C. (<20° C.) | about 15° C. (<20° C.) | about 15° C. (<20° C.) | <20° C. |

For obtaining the above target relative humidities demineralised water was dosed into the conveying line directly after the rotary valve into the POP/POE pellets falling out of the extruder. At the start of the conveying of the batch the waterdosing was normally controlled and adapted to reduce pressure and increase capacity (and to reduce streamers). Humidity/moisture analysis took place in exhaust air from the conveying line. In PT1 free water was conveyed together with the pellets.

The following conveying pressures and conveying capacities have been measured:

PT1:
Line 1 (120 meter traject): Pressure decreases from 0.65 to 0.52 Barg with same capacity of 6.5 tons/hr. Clean air pressure is 0.35 Barg
Line 2 (110 meter traject): Pressure decreases from 0.90 to 0.55 Barg with same capacity of 9.0 tons/hr. Clean air pressure is 0.20 Barg PT3:
Line 1 (325 meter traject): Waterdosing during conveying of batch with same rotary speed changed from 6 kg/hr to 0 kg/hr. Pressure increases from 0.54 to 0.64 Barg. Clean air pressure is 0.174 Barg.
Line 1 (325 meter traject): Waterdosing during conveying of batch with same rotary speed changed from 0 kg/hr to 2 kg/hr. Pressure decreases from 0.54 to 0.45 Barg. Clean air pressure is 0.174 Barg.
Line 2 (354 meter traject): Waterdosing during conveying of batch with same rotary speed changed from 5 kg/hr to 10 kg/hr. Pressure decreases from 0.75 to 0.6 Barg. Clean air pressure is 0.24 Barg.
Line 2 (354 meter traject): Waterdosing during conveying of batch with same rotary speed changed from 5 kg/hr to 10 kg/hr. Pressure decreases from 0.85 to 0.70 Barg. Clean air pressure is 0.174 Barg.

The invention claimed is:

1. A method for transporting polyolefin particles in a polymer conveying system, comprising the steps of:
 a) subjecting the polyolefin particles to moist conveying gas to produce wetted polyolefin particles;
 b) transporting the wetted polyolefin particles through at least one conveying line; and
 c) controlling the amount of moisture in the conveying gas of the polymer conveying system as such that at the downstream end point of the at least one conveying line the relative humidity of the conveying gas ($RH_{CG}$) is 40% to 100%,
 wherein the temperature in the polymer conveying system is maintained in a range of from 5° C. to 20° C.

2. The method according to claim 1, wherein the polymer conveying system is an gas conveying system selected from a pneumatic conveying system and a vacuum conveying system.

3. The method according to claim 1, wherein the conveying gas is selected from air, nitrogen or argon.

4. The method according to claim 1, wherein the moist conveying gas is produced by dosing water into the conveying gas of the polymer conveying system at the upstream end of the at least one conveying line.

5. The method according to claim 1, further comprising the steps of:
 subjecting the conveyed polyolefin particles to ionized gas.

6. The method according to claim 1, further comprising the step of:
 separating dust from the conveyed polyolefin particles.

7. The method according to claim 1, further comprising the step of:
 reducing the moisture in a storage gas surrounding the conveyed polyolefin particles to 20% to 80% relative humidity ($RH_{SG}$) to produce polyolefin particles with reduced moisture content; and
 storing the polyolefin particles with reduced moisture content in the storage gas with reduced relative humidity.

8. The method according to claim 1, wherein the temperature in the polymer conveying system is maintained in a range of from 10° C. to 15° C.

9. The method according to claim 1, wherein the polyolefin particles are polyolefin pellets.

10. The method according to claim 1, wherein the polyolefin particles are selected from particles of propylene homo- or copolymer and particles of ethylene homo- or copolymer.

11. The method according to claim 1, wherein the polyolefin of the polyolefin particles has a density of from less than 850 to 910 kg/m$^3$.

12. The method according to claim 1, wherein the polyolefin of the polyolefin particles has a density of from 900 to 980 kg/m$^3$.

* * * * *